United States Patent Office 3,225,040
Patented Dec. 21, 1965

3,225,040
6 - (1,2,3,4 - TETRAHYDRO - 2 - THIOXO - 4,4,6-TRIMETHYL - 1 - PYRIMIDINYL) - 2 - BENZOTHIAZOLYLTHIOCARBAMATES
John J. D'Amico, Charleston, W. Va., and Ching C. Tung, Kirkwood, Mo., assignors to Monsanto Company, a corporation of Delaware
No Drawing. Original application Sept. 15, 1961, Ser. No. 138,296, now Patent No. 3,151,114, dated Sept. 29, 1964. Divided and this application Dec. 27, 1963, Ser. No. 334,024
9 Claims. (Cl. 260—247.1)

This application is a division of Serial No. 138,296 filed September 15, 1961, now Patent No. 3,151,114, September 29, 1964.

The present invention relates to 1,2,3,4-tetrahydro-1 - (2 - mercapto - 6 - benzothiazolyl)-2-thioxo - 4,4,6-trimethylpyrimidine and dervatives thereof.

1,2,3,4-tetrahydro-1 - (2-mercapto-6-benzothiazolyl)-2-thioxo-4,4,6-trimethylpyrimidine can exist in two tautomeric forms as follows:

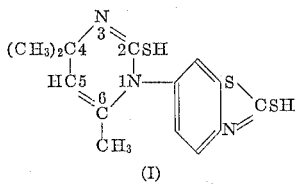

(I)

and

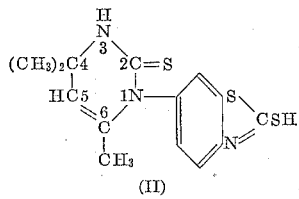

(II)

The structure is undoubtedly II predominately. For example a disodium salt does not form. Of course, the same tautomerism is possible in the mercaptothiazole nucleus but the mercaptan structure is generally accepted and is consistent with the chemical properties observed. The preparation and properties of this compound are described in detail below:

Example 1

To a stirred slurry containing 79.0 grams (0.5 mole) of 1,1-dimethyl-3-oxobutylthiocyanic acid, 750 ml. of water and 6 grams of concentrated sulfuric acid was added in one portion 91.1 grams (0.5 mole) of 6-amino-2-mercaptobenzothiazole and the mixture heated at 80–90° C., for a period of 3 hours. After cooling to 25° C., the precipitate was collected by filtration, washed with water until the washings were neutral to litmus and air-dried at 25–30° C. 1,4-dihydro-1-(2-mercapto-6-benzothiazolyl)-4,4,6-trimethyl - 2-pyrimidinethiol (predominately 1,2,3,4-tetrahydro - 1-(2-mercapto-6-benzothiazolyl)-2-thioxo-4,4,6-trimethylpyrimidine) was obtained in 97.5% yield. After recrystallization from dilute ethyl alcohol it melted at 207–209° C. Analysis gave 13.07% nitrogen and 29.34% sulfur compared to 13.07% nitrogen and 29.72% sulfur calculated for $C_{14}H_{15}N_3S_3$. This compound accelerates vulcanization of natural and synthetic rubber and imparts considerable processing safety. It is also a valuable intermediate and undergoes reactions typical of those known for mercaptobenzothiazole involving the mercaptan radical.

Since the mercapto hydrogen in the thiazole ring is active, a variety of derivatives can be obtained by replacing the hydrogen by other groups, as for example salt-forming groups and organic radicals. Among the organic radicals which may replace hydrogen are alkyl, alkenyl, halogen substituted alkenyl, dialkylaminoethyl, 2-butenylene, 2-butynyl, 2-propynyl, 2-cyclohexenyl, 2-oxocyclohexyl, 5,5,7,7-tetramethyl-2-octenyl, $$—CH_2—NH—$$

groups such as

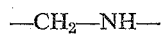
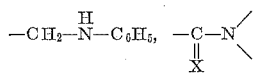

where X is sulfur or oxygen and the valences on the nitrogen may be satisfied by open or closed chain aliphatic radicals or divalent radicals which with nitrogen constitute a heterocyclic group, or phenyl,

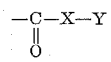

groups where X is sulfur or oxygen and Y is lower alkyl or alkenyl,

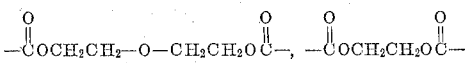

$CH_2COOH$, and chlorophenoxyacetyl. These, of course, are only illustrative of a few of the possible derivatives. All of them accelerate vulcanization to a greater or less degree. Replacing mercapto hydrogen with radicals which inactivate mercaptobenzothiazole do not appear to have the same effect on the product of Example 1. The term "free mercaptan" hereafter designates the product of Example 1.

Example 2

A solution containing 32.2 grams (0.1 mole) of free mercaptan, 6.3 grams (0.1 mole) of 90% potassium hydroxide, 500 ml. of acetone and 10 ml. of water was heated to 56° C. While stirring the resultant solution at 25° C. there was added in one portion 10.8 grams (0.1 mole) of dimethylcarbamyl chloride. The reaction mixture was stirred at 25–30° C. for 5½ hours and then added to 1000 grams of ice-water. Stirring was continued at 0–10° C. for 30 minutes. The percipitate was collected by filtration, washed with water until the washings were neutral to litmus and air-dried at 25–30° C. 6-(1,2,3,4 - tetrahydro - 2 - thioxo-4,4,6-trimethyl-1-pyrimidinyl)-2-benzothiazolyl dimethylthiolcarbamate was obtained in 61.4% yield as a tan solid melting at 196–198° C. after recrystallization from ethyl alcohol/acetone mixture. Analysis gave 13.70% nitrogen and 24.99% sulfur compared to 14.27% nitrogen and 24.51% sulfur calculated for $C_{17}H_{20}N_4OS_3$.

Employing the same procedure and substituting the appropriate halide, other products prepared were:

No. 3. 6-(1,2,3,4-tetrahydro-2-thioxo-4,4,6-trimethyl-1-pyrimidinyl)-2 - benzothiazolyl N - ethyldithiocarbanilate in 97.5% yield from N-ethylphenylthiocarbamyl chloride. The reaction mixture was stirred at 25–30° C. for 24 hours. The product was a tan solid melting at 173–175° C. after recrystallization from dilute acetone. Analysis gave 10.82% nitrogen compared to 11.56% calculated for $C_{23}H_{24}N_4S_4$.

No. 4. 6 - (1,2,3,4-tetrahydro-2-thioxo-4,4,6-trimethyl-1-pyrimidinyl)-2 - benzothiazolyl 1 - pyrrolidinecarbothiolate in 52.5% yield from 1-pyrrolidinecarbamyl chloride. The reaction mixture was stirred at 25–30° C. for 5½ hours. The product was a yellow-green solid melting at 181–183° C. after recrystallization from dilute acetone. Analysis gave 12.96% nitrogen compared to 13.39% calculated from $C_{19}H_{22}N_4OS_3$.

No. 5. 6 - (1,2,3,4-tetrahydro-2-thioxo-4,4,6-trimethyl-1-pyrimidinyl)-2-benzothiazolyl 1 - pyrrolidinecarbodithioate in 11.5% yield from 1-pyrrolidinethiocarbamyl chloride. The reaction mixture was stirred at 25–30° C. for 24 hours. The product was a tan solid melting at 218–220° C. with decomposition. Analysis gave 12.16% nitrogen compared to 12.89% calculated for $C_{19}H_{22}N_4S_4$.

No. 6. 6 - (1,2,3,4-tetrahydro-2-thioxo-4,4,6-trimethyl-1-pyrimidinyl)-2-benzothiazolyl 1 - piperidinecarbodithioate in 89.4% yield from piperidinethiocarbamyl chloride. The reaction mixture was stirred at 25–30° C. for 24 hours. The product was a tan solid melting at 151–153° C. after recrystallization from alcohol/chloroform. Analysis gave 11.93% nitrogen and 28.44% sulfur compared to 12.49% nitrogen and 28.59% sulfur calculated for $C_{20}H_{24}N_4S_4$.

No. 7. 6 - (1,2,3,4-tetrahydro-2-thioxo-4,4,6-trimethyl-1-pyrimidinyl)-2-benzothiazolyl-2,6-dimethylmorpholinocarbodithioate in 41.9% yield from 2,6-dimethylmorpholinethiocarbamyl chloride. A semi-solid resulted after adding 1000 grams of ice-water and stirring at 0–10° C. for an hour. To this semi-solid was added 500 ml. of ethyl ether and stirring was continued at 0–10° C. for another thirty minutes. A precipitate then formed which was isolated as hereinbefore described. The product was a tan solid melting at 173–174° C. after recrystallization from dilute acetone. Analysis gave 11.89% nitrogen and 26.25% sulfur compared to 11.70% nitrogen and 26.78% sulfur calculated for $C_{21}H_{26}N_4OS_4$.

In the following preparations the solution was made up of 32.2 grams (0.1 mole) of free mercaptan, 500 ml. of acetone and 6.6 grams (0.1 mole) of 85% potassium hydroxide:

No. 8. 6 - (1,2,3,4-tetrahydro-2-thioxo-4,4,6-triemthyl-1-pyrimidinyl)-2-benzothiazolyl diethyldithiocarbamate in 96.5% yield from diethylthiocarbamyl chloride dissolved in 100 ml. of acetone. The stirred reaction mixture was maintained at 25–30° C. for 5½ hours. The product was a tan solid melting at 227° C. after recrystallization from chloroform and ethyl acetate. Analysis gave 12.30% nitrogen compared to 12.83% calculated for $C_{19}H_{24}N_4S_4$.

No. 9. 6 - (1,2,3,4-tetrahydro-2-thioxo-4,4,6-trimethyl-1-pyrimidinyl)-2-benzothiazolyl dimethyldithiocarbamate in 61.3% yield from dimethylthiocarbamyl chloride dissolved in 100 ml. of acetone. The product was a tan solid melting at 213–215° C. after recrystallization from chloroform and ethyl alcohol. Analysis gave 13.98% nitrogen compared to 13.71% calculated for $C_{17}H_{20}N_4S_4$.

No. 10. 6-(1,2,3,4-tetrahydro-2-thioxo-4,4,6-trimethyl-1-pyrimidinyl) - 2 - benzothiazolyl morpholinecarbodithioate in 97.5% yield from morpholinethiocarbamyl chloride. The product was a tan solid melting at 199–201° C. after recrystallization from chloroform and ether. Analysis gave 12.25% nitrogen compared to 12.43% calculated for $C_{19}H_{22}N_4OS_4$.

No. 11. 6-(1,2,3,4-tetrahydro-2-thioxo-4,4,6-trimethyl-1 - pyrimidinyl) - 2 - benzothiazolyl diisopropyldithiocarbamate in 88.2% yield from diisopropylthiocarbamyl chloride. The product was a tan solid melting at 197–199° C. after recrystallization from chloroform and ether. Analysis gave 12.27% nitrogen and 27.36% sulfur compared to 12.06% nitrogen and 27.60% sulfur calculated for $C_{21}H_{28}N_4S_4$.

No. 12. 6-(1,2,3,4-tetrahydro-2-thioxo-4,4,6-trimethyl-1-pyrimidinyl)-2 - benzothiazolyl dibutyldithiocarbamate in 99.5% yield from dibutylthiocarbamyl chloride. The product was a tan solid melting at 180–182° C. after recrystallization from chloroform and ether. Analysis gave 25.82% sulfur compared to 26.03% calculated for $C_{23}H_{32}N_4S_4$.

No. 13. 6-(1,2,3,4-tetrahydro-2-thioxo-4,4,6-trimethyl-1-pyrimidinyl)-2-benzothiazolyl diethylthiolcarbamate in 76.0% yield from diethylcarbamyl chloride. The product was a tan solid melting at 144–146° C. Analysis gave 13.39% nitrogen and 23.08% sulfur compared to 13.32% nitrogen and 22.87% sulfur calculated for $C_{19}H_{24}N_4OS_3$.

No. 14. 6-(1,2,3,4 - tetrahydro-2-thioxo-4,4,6-trimethyl-1-pyrimidinyl)-2-benzothiazolyl dipropyldithiocarbamate in 54.0% yield from dipropylthiocarbamyl chloride. The product was a tan solid melting at 185–187° C. after recrystallization from chloroform and ether. Analysis gave 12.12% nitrogen and 26.95% sulfur compared to 12.06% nitrogen and 27.60% sulfur calculated for $C_{21}H_{28}N_4S_4$.

As further illustrative of the invention, natural rubber tread stocks were compounds comprising:

| | Parts by weight |
|---|---|
| Smoked sheets rubber | 100.0 |
| Carbon black | 50.0 |
| Zinc oxide | 5.0 |
| Stearic acid | 3.0 |
| Saturated hydrocarbon softener | 3.0 |
| Sulfur | 2.5 |
| Antioxidant | 1.0 |
| Accelerator | 0.5 |

The accelerator added to the base stock is indicated below.

Stock:
A. 6 - (1,2,3,4 - tetrahydro - 2 - thioxo - 4,4,6 - trimethyl-1-pyrimidinyl)-2-benzothiazolyl dimethylthiolcarbamate B. 6 - (1,2,3,4 - tetrahydro - 2 - thioxo - 4,4,6 - trimethyl-1-pyrimidinyl)-2-benzothiazolyl N - ethyldithiocarbanilate C. 6 - (1,2,3,4 - tetrahydro - 2 - thioxo - 4,4,6 - trimethyl-1-pyrimidinyl)-2-benzothiazolyl 1-pyrrolidinecarbothiolate D. 6 - (1,2,3,4 - tetrahydro - 2 - thioxo - 4,4,6 - trimethyl-1-pyrimidinyl)-2-benzothiazolyl 1-pyrrolidinecarbodithioate E. 6 - (1,2,3,4 - tetrahydro - 2 - thioxo - 4,4,6 - trimethyl-1-pyrimidinyl)-2 - benzothiazolyl 1-piperidinecarbodithioate F. 6 - (1,2,3,4 - tetrahydro - 2 - thioxo - 4,4,6 - trimethyl - 1 - pyrimidinyl) - 2 - benzothiazolyl - 2,6-dimethylmorpholinocarbodithioate The stocks were cured in the usual manner by heating in a press for different periods of time at 144° C. Processing safety of the vulcanizable stocks was evaluated by means of a Mooney plastometer. The figures recorded were the times required for the Mooney plasticity at 135° C. to rise ten points above the minimum value. The modulus and tensile properties of the 60 minute cures are recorded:

TABLE I

| Stock | Modulus of Elasticity in lbs./in.² at Elongation of 300% | Tensile at Break in lbs./in.² | Mooney Scorch at 135° C. |
|---|---|---|---|
| A | 1,250 | 2,150 | 12.8 |
| B | 1,880 | 3,600 | 13.6 |
| C | 1,170 | 2,240 | 11.5 |
| D | 1,500 | 2,050 | 12.4 |
| E | 1,950 | 2,980 | 12.7 |
| F | 1,710 | 3,060 | 13.3 |

As further examples of the invention rubber base stocks were prepared comprising:

| | Parts by weight |
|---|---|
| Smoked sheets rubber | 100.0 |
| Carbon black | 50.0 |
| Zinc oxide | 5.0 |
| Stearic acid | 3.0 |
| Saturated hydrocarbon softener | 3.0 |
| Antioxidant | 1.5 |
| Sulfur | 2.5 |
| Accelerator | 0.5 |

Accelerators added to the base stock were:

Stock:
- G. 6-(1,2,3,4-tetrahydro-2-thioxo-4,4,6-trimethyl-1-pyrimidinyl)-2-benzothiazolyl diethyldithio carmate
- H. 6-(1,2,3,4-tetrahydro-2-thioxo-4,4,6-trimethyl-1-pyrimidinyl)-2-benzothiazolyl dimethyldithiocarbamate
- J. 6-(1,2,3,4-tetrahydro-2-thioxo-4,4,6-trimethyl-1-pyrimidinyl)-2-benzothiazolyl morpholinecarbodithioate
- K. 6-(1,2,3,4-tetrahydro-2-thioxo-4,4,6-trimethyl-1-pyrimidinyl)-2-benzothiazolyl diisopropyldithiocarbamate
- L. 6-(1,2,3,4-tetrahydro-2-thioxo-4,4,6-trimethyl-1-pyrimidinyl)-2-benzothiazolyl dibutyldithiocarbamate
- M. 6-(1,2,3,4-tetrahydro-2-thioxo-4,4,6-trimethyl-1-pyrimidinyl)-2-benzothiazolyl diethylthiolcarbamate
- N. 6-(1,2,3,4-tetrahydro-2-thioxo-4,4,6-trimethyl-1-pyrimidinyl)-2-benzothiazolyl dipropyldithiocarbamate The compositions were vulcanized by heating for different periods of time in the usual manner in a press at 144° C. The accelerating properties of the 15 minute cures and processing safety are recorded in Table II.

TABLE II

| Stock | Modulus of Elasticity in lbs./in.² at Elongation of 300% | Tensile at Break in lbs./in.² | Mooney Scorch Time at 135° C. Time in Mins. for 10 Point Rise Above Minimum |
|---|---|---|---|
| G | 2,160 | 4,350 | 10.6 |
| H | 1,640 | 3,780 | 11.6 |
| J | 1,630 | 3,580 | 9.9 |
| K | 1,510 | 3,240 | 9.3 |
| L | 2,080 | 4,200 | 10.0 |
| M | 1,010 | 2,380 | 8.3 |
| N | 2,000 | 3,900 | 9.8 |

It is intended to cover all changes and modifications of the examples of the invention herein chosen for purposes of disclosure which do not constitute departures from the spirit and scope of the invention.

What is claimed is:

1. A compound of the formula

where T is 6-(1,2,3,4-tetrahydro-2-thioxo-4,4,6-trimethyl-1-pyrimidinyl)-2-benzothiazolyl, X is selected from a group consisting of oxygen and sulfur, R is selected from a group consisting of lower alkyl and phenyl, R' is lower alkyl and R and R' taken together and with the nitrogen attached thereto constitute a heterocyclic radical selected from the group consisting of 1-pyrrodinyl, piperidino, morpholino, and dimethylmorpholino.

2. 6-(1,2,3,4-tetrahydro-2-thioxo - 4,4,6-trimethyl-1-pyrimidinyl)-2-benzothiazolyl N-ethyldithiocarbanilate.

3. 6-(1,2,3,4-tetrahydro-2-thioxo - 4,4,6-trimethyl-1-pyrimidinyl)-2-benzothiazolyl 1-piperidinecarbodithioate.

4. 6-(1,2,3,4-tetrahydro-2-thioxo - 4,4,6-trimethyl-1-pyrimidinyl) - 2-benzothiazolyl 2,6-dimethylmorpholinecarbodithioate.

5. 6-(1,2,3,4-tetrahydro-2-thioxo - 4,4,6-trimethyl-1-pyrimidinyl)-2-benzothiazolyl diethyldithiocarbamate.

6. 6-(1,2,3,4-tetrahydro-2-thioxo - 4,4,6-trimethyl-1-pyrimidinyl)-2-benzothiazolyl dibutyldithiocarbamate.

7. 6-(1,2,3,4-tetrahydro-2-thioxo - 4,4,6-trimethyl-1-pyrimidinyl)-2-benzothiazolyl dipropyldithiocarbamate.

8. 6-(1,2,3,4-tetrahydro-2-thioxo - 4,4,6-trimethyl-1-pyrimidinyl)-2-benzothiazolyl dimethyldithiocarbamate.

9. 6-(1,2,3,4-tetrahydro-2-thioxo - 4,4,6-trimethyl-1-pyrimidinyl)-2-benzothiazolyl diethylthiolcarbamate.

No references cited.

IRVING MARCUS, *Primary Examiner.*

NICHOLAS S. RIZZO, *Examiner.*